June 27, 1933.  E. F. WAIT  1,915,963
METHOD OF TIRE CONSTRUCTION
Filed Sept. 30, 1930
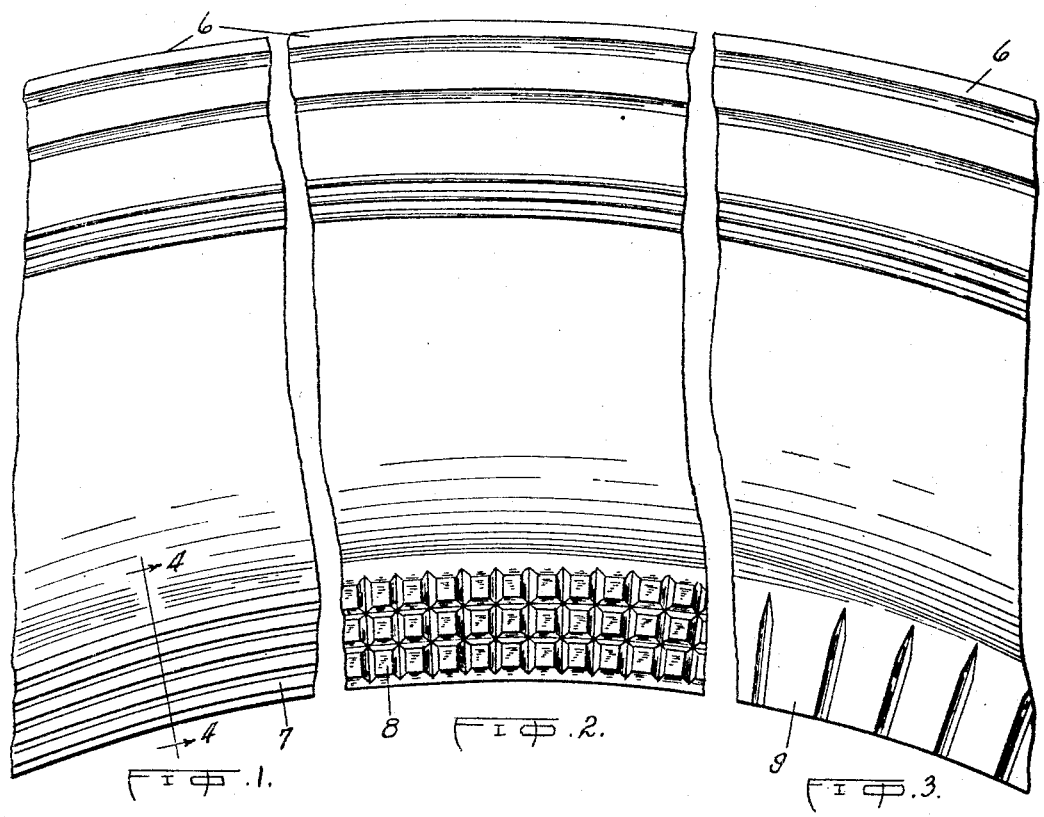
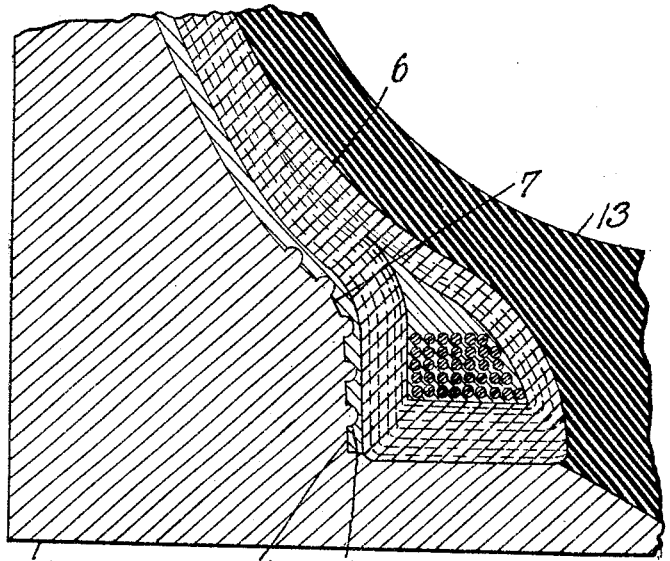
INVENTOR
EDGAR F. WAIT.
BY
Ely & Barrow
ATTORNEYS.

Patented June 27, 1933

1,915,963

UNITED STATES PATENT OFFICE

EDGAR F. WAIT, OF AKRON, OHIO, ASSIGNOR TO THE FIRESTONE TIRE & RUBBER COMPANY, OF AKRON, OHIO, A CORPORATION OF OHIO

METHOD OF TIRE CONSTRUCTION

Application filed September 30, 1930. Serial No. 485,465.

This invention relates to pneumatic tires and more particularly to a method for replacing the usual chafer strips surrounding the beads of the tire.

Heretofore in the construction of pneumatic tires it has been the standard practice to cover the bead portions of the tire with chafer strips which are applied after the plies themselves have been stitched around the beads. The chafer strips act as buffers between the rim and the carcass of the tire and prevent cutting or frictional wear on the tire carcass.

The general purpose of the invention is to provide a method of tire construction to replace the usual chafer strips.

A more particular object of the invention resides in devising a method of providing an all rubber chafer on a pneumatic tire to replace the standard rubberized fabric chafer strips.

It is also an object of the invention to provide a substitute for the usual chafer strips which substitute will serve to assist in holding the sidewalls of the tire in position during the cure.

The foregoing and other objects of the invention are achieved by the means illustrated in the accompanying drawing and described below, it being understood that the invention is not limited to the exact details shown and described.

In the drawing:

Figure 1 is a side elevation of a portion of a pneumatic tire illustrating the chafer means embodying the invention.

Figure 2 is a view similar to Figure 1 of a modified form of the invention.

Figure 3 is a view similar to Figures 1 and 2 illustrating a modified form of the invention.

Figure 4 is an enlarged sectional view showing the tire of Figure 1 in the tire mold.

Referring to the drawing the numeral 6 indicates a straight side pneumatic tire of standard design and construction with the single exception that the usual chafer strip which surrounds the bead portion of the tire is omitted. The fabric chafer strip is replaced by a rubber chafer which may take a plurality of forms. For example circumferential ribs 7, shown in Figure 1, squares 8, shown in Figure 2, or radial ribs 9, shown in Figure 3. The rubber serves to prevent wear between the tire carrying rim and the tire carcass. As shown in Figure 4 ribs 7 are molded by complementary grooves 10 defined by ribs 11 in mold 12. The air bag used during vulcanization is shown at 13.

In all cases the rubber chafer serves to assist in holding the sidewalls of the tire in the proper position during the vulcanization or cure of the tire as the rubber in the sidewalls cannot flow down about the bead portion of the tire because of the chafer rubber. The ribs 11 on the tire mold 12 which form the grooves in the chafer rubber serve to maintain the thickness of the chafer rubber by spacing the bead portion of the tire from the tire mold.

While in describing the invention the chafer rubber has been described as replacing the chafer strip it will be apparent that the chafer rubber may be used in combination with the usual chafer strip. The invention also contemplates applying the rubber chafer completely around the bead or to the bottom and outer side as will be understood.

As many other changes could be made in the construction, particularly with respect to the shape and configuration of the chafer rubber, it is intended that all matter contained in the foregoing description or illustrated in the accompanying drawing shall be interpreted as illustrative only and not in a limiting sense. Accordingly, various modifications of the invention can be resorted to without departing from the spirit of the invention or the scope of the appended claims.

What is claimed is:

1. The method of molding a pneumatic tire comprising applying a strip of rubber compound about the beads of the tire, providing means in the tire mold for positively spacing the beads of the tire away from the bead molding portion of the tire mold, and vulcanizing the tire in the mold while the beads are so spaced therefrom, whereby the rubber chafer will not be forced away from its proper position during vulcanization.

2. The method of building a pneumatic tire comprising applying a rubber side wall strip on the body of the tire, applying a rubber chafer strip about the beads of the tire, and confining the chafer strip rubber to the bead portions of the tire during vulcanization to prevent the chafer rubber from flowing into the side wall region and to prevent the side wall rubber from flowing into the chafer region.

3. The method of molding a pneumatic tire comprising applying a strip of rubber compound about the beads of the tire, providing projections in the tire mold for positively spacing the beads of the tire away from the bead molding portion of the tire mold, and vulcanizing the tire in the mold while the beads are so spaced therefrom, whereby the rubber chafer will not be forced away from its proper position during vulcanization.

4. The method of vulcanizing a rubber chafer on a pneumatic tire comprising positively maintaining the beads of the tire and the bead molding portions of the tire mold in spaced apart relation and vulcanizing strips of rubber to the tire beads in the cavities thus formed.

EDGAR F. WAIT.